Sept. 8, 1936. C. H. LARSON Re. 20,099

RELAY

Original Filed July 5, 1932

Inventor:
Carl H. Larson
By Gillson, Mann & Co.
Attys.

Reissued Sept. 8, 1936 Re. 20,099

UNITED STATES PATENT OFFICE 20,099

RELAY

Carl H. Larson, Elkhart, Ind., assignor to The Adlake Company, Elkhart, Ind., a corporation of Illinois Original No. 1,967,943, dated July 24, 1934, Serial No. 620,770, July 5, 1932. Application for reissue June 5, 1936, Serial No. 83,818

17 Claims. (Cl. 200—97)

The principal object of this invention is to provide a mercury switch relay that will delay opening a circuit for a selected period after the armature has been raised and will close that circuit immediately after it has been lowered.

Figure 1:
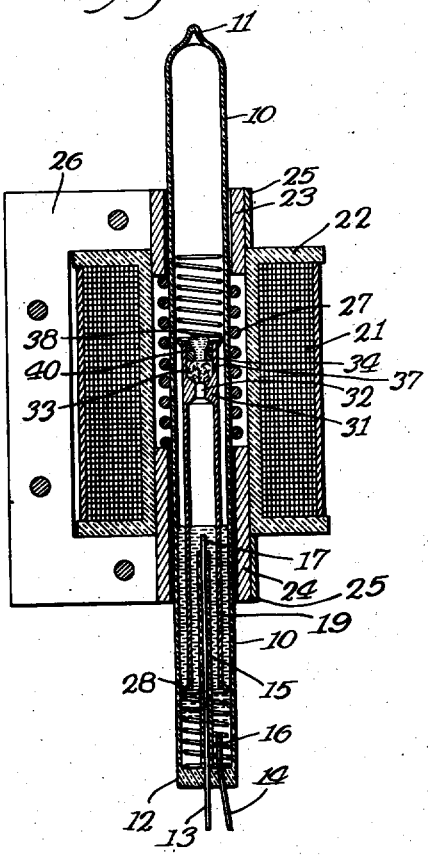
Fig. 1 is a vertical section through a back contact relay, showing the parts in closed circuit position.

But the drawing and the correspondingly specific description are used for the purpose of illustration and disclosure only, and are not intended to define the scope of the claims.

The glass envelope 10 is a cylinder sealed off at the top at 11, and having a flat base 12 at the bottom, in which latter lead-in conductors 13 and 14 are sealed. The conductor 13 projects a considerable distance into the envelope, and is surrounded by a glass sleeve 15, fused to the base 12. The conductors are equipped with suitable terminals 16 and 17, respectively.

Within the envelope is a charge of mercury 18, a displacer 19, springs 20 to protect the envelope from the displacer, and a gas fill of helium, hydrogen, or the like. The displacer 19 is made of Swedish iron, on account of its high permeability and low residual magnetism, but of course, may be made of other iron or other magnetic material. It is raised from the position shown in Fig. 1 to that shown in Figs. 2 and 3 by an electromagnet comprising a solenoid 21, wound on a spool 22.

The envelope 10 is loosely fitted in soft iron sleeves 23 and 24, clamped by clips 25 to a yoke 26 of laminated iron. The envelope is held in adjusted position by the friction of a coil spring 27 of non-magnetic wire, such as phosphor bronze, wound tightly on the envelope and bearing against the adjacent ends of the sleeves 23 and 24.

Externally, the displacer is a plain cylinder with narrow flanges 28 at its top and bottom, recessed at 29 to permit free flow of gas or mercury. Internally, the displacer is also a simple cylinder for the major portion of its length, indicated by the bore 30. Above this it is modified to provide a vent for allowing gas to escape rapidly, and also a small or narrow bore for allowing gas to enter slowly.

In the specific construction, the drill inserted from the bottom is withdrawn and entered from the top, leaving a partition 31 which is later drilled to a smaller diameter 32. Above the partition is a mass of burnt asbestos fiber 33, clean hair, steel wool, or the like, and above this is a metal ring 34, having a flaring seat 35, below which is a short cylindrical bore 36. The wall of the cylinder opposite the asbestos, or the like, has a small or narrow bore 37.

*Operation*

Figure 2:
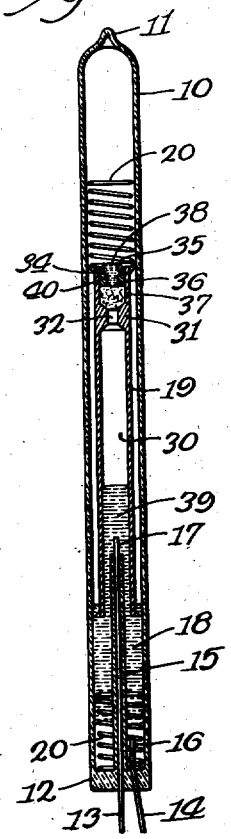
Fig. 2 is a similar section, showing the parts just after the magnet has been energized and the displacer raised, but before the circuit has been broken.
Figure 3:
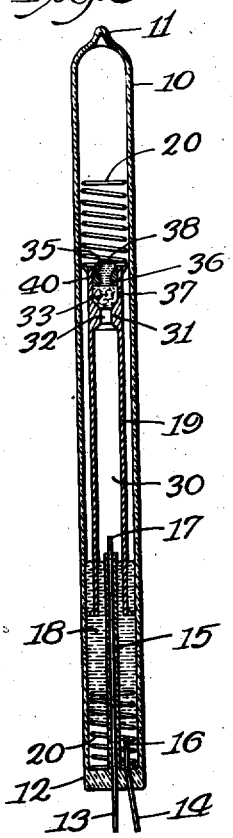
Fig. 3 is a similar view, showing the circuit broken.
Figure 4:
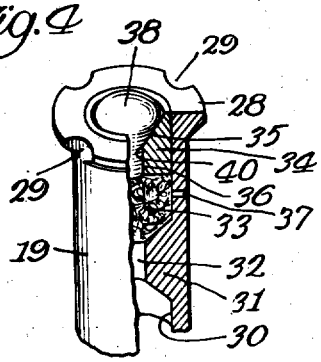
Fig. 4 is a perspective view of the upper portion of the displacer.
Figure 5:
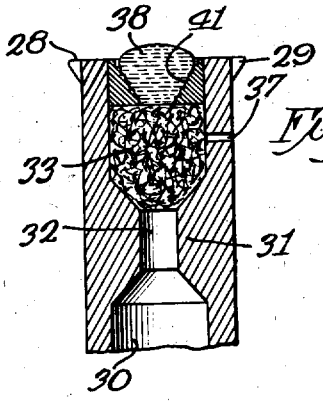
Fig. 5 is a sectional view through the upper portion of a modified form of displacer.

Assuming the parts to be in the position shown in Fig. 1, when the electromagnet is energized, the displacer moves to close the gap between the adjacent ends of the sleeves 23 and 24, and assumes the position substantially as shown in Fig. 2. A globule or meniscus of mercury 38, resting on the seat 35, excludes the ingress of gas except as it can slowly pass through the small or narrow opening 37; hence mercury is drawn up from below, as indicated at 39 (Fig. 2), maintaining the circuit between the electrodes 16 and 17 closed by the mercury. However, in time sufficient gas will enter the bore of the displacer to relieve the partial vacuum, and the mercury will descend to the position shown in Fig. 3, where the circuit is open.

Upon deenergizing the magnet, the displacer will immediately drop to the position shown in Fig. 1, by its own weight. At the outset this movement will increase the pressure of the gas within the displacer above the mercury, which will rush easily through the asbestos and pass out between the metal and the mercury globule or meniscus 38, with the result that the displacer raises the mercury level immediately and closes the circuit between the electrodes 16 and 17, as shown in Fig. 1.

The globule or meniscus of mercury 38 will not pass through the asbestos, or other fibrous material, and acts as a check valve, allowing the gas to pass readily out of the displacer but restraining it from entering the top of the displacer. Just why the mercury will so act is open to some speculation, and no attempt is made to explain the scientific reasons. The fact remains, however, that the mercury will not pass through the packing 33, and a perfect seal is obtained against ingress of gas. Obviously, the denser the material which constitutes the packing, the less tendency there is for the mercury globule to be sucked down. Providing ridges on the seat as shown at 41 in Fig. 3, reduces the tendency of the mercury to be drawn downwardly.

The small or narrow bore 37 may be placed anywhere above the mercury level in the envelope, but preferably is entered opposite the asbestos or other fiber, because that material acts as a filter in restraining vapor particles, which rise after the circuit is broken and have a tendency to collect around any opening and vary the flow through it. The asbestos seems to collect these vapor particles at or near its lower surface and thus maintain the flow through the opening 37 practically uniform.

The check valve arrangement employing a mercury seal is particularly noteworthy because it is virtually impossible to obtain a hermetic seal by the use of a solid ball such as rubber or metal, inasmuch as the gas pressure differentials are comparatively small. The inability to produce a solid ball of metal or other material having exact roundness also renders the use of such a check valve impractical for sealing gas.

The time delay may be varied quite widely by changing the proportions. Also by adjusting the envelope with respect to the magnet. In one form that has been found very satisfactory, the displacer has a ¼ inch external diameter and a $\frac{3}{16}$ths inch internal diameter. The bore 32 is ⅛th of an inch in diameter; the ring 34 is $\frac{3}{32}$nds of an inch in vertical dimension; the flare 35 is at an angle of forty-five degrees, and the opening 36 is 5/64ths of an inch in diameter. The cylindrical bore below the ring is $\frac{3}{32}$nds of an inch long. The small opening 37 is 1/1000th of an inch in diameter, and the time delay is approximately ten seconds, with the envelope and magnet in substantially the position as shown in the drawing.

Although the invention has been shown applied to a back contact relay, it is obvious that it is equally applicable to a front contact relay, in which the electrodes are disconnected when the coil is deenergized, but are bridged with mercury when the displacer is lowered by magnetic attraction.

I claim as my invention:—

1. In a relay, a sealed envelope containing electrodes which, when electrically connected, close an electrical circuit, a charge of liquid, a gas fill, and a displacer including a hollow body presenting a wide bottom opening to the liquid and a narrow opening to the gas, the displacer also having a gas vent, and a check valve controlling the vent whereby liquid is allowed to enter the displacer rapidly and gas is restricted to slow entry but allowed to escape rapidly from the displacer, said electrodes being arranged so that the opened or closed condition of the switch is determined by the height of the liquid within the displacer with respect to a fixed point on the envelope.

2. In a relay, a sealed envelope containing electrodes which, when electrically connected, close an electrical circuit, a charge of liquid, a gas fill, and a displacer including a hollow body having a wide bottom opening to allow free entrance and exit to liquid, a narrow upper opening to permit slow entrance of gas, and a vent to allow free exit of gas, and a check-valve for the vent to prevent entrance of gas through it, the electrodes being so arranged that the opened or closed condition of the switch is determined by the height of the liquid within the displacer with respect to a fixed point on the envelope.

3. In a mercury switch relay, a sealed envelope containing electrodes which, when electrically connected, close an electrical circuit, a charge of mercury, a gas fill, and a displacer comprising a hollow body having a wide bottom opening to allow free flow of mercury into the body, and a vent permitting free flow of gas out of the body whereby the body may readily descend into the mercury, said body also having a restricted opening for gas to enter the body and being provided with a mercury valve to check the entrance of gas through the vent, the electrodes being so arranged that the opened or closed condition of the switch is determined by the height of the liquid within the displacer with respect to a fixed point on the envelope.

4. In a mercury switch relay, a sealed envelope containing electrodes, a charge of mercury, a gas fill, and a displacer comprising a hollow body having a wide bottom opening to allow free flow of mercury into the body, and a narrow opening above the mercury level to allow restricted flow of gas, the body also having a vent provided with a flaring seat above, and a plug of fibers below the seat allowing free flow of gas out of the hollow body.

5. In a mercury switch, a switch envelope, spaced electrodes in the envelope, a gas fill, a quantity of mercury in the envelope adapted to be manipulated, to make or break an electrical circuit through the electrodes, a hollow body presenting a relatively large opening to the mercury and equipped with means for passing gas rapidly through the upper portion of the body in one direction, but slowly in the other direction, whereby the movement of mercury in the body is retarded in one direction only, said electrodes being arranged so that the opened or closed condition of the switch is determined by the height of the mercury within the body with respect to a fixed point on the envelope.

6. In a mercury switch, a switch envelope, spaced electrodes in the envelope, a gas fill, a quantity of mercury in the envelope adapted to be manipulated to make or break an electrical circuit through the electrodes, a displacer for changing the mercury level in the envelope, said displacer presenting a relatively large opening to the mercury and being equipped with means for permitting a free escape of gas from the displacer but a slow admittance of gas to the displacer when the large opening is closed by mercury, whereby the movement of mercury within the displacer is retarded when receding only, said electrodes being arranged so that the opened or closed condition of the switch is determined by the height of the mercury within the displacer with respect to a fixed point on the envelope.

7. For use with a relay coil, a circuit breaker comprising a switch envelope, spaced electrodes in the envelope, a gas fill, a mercury fill adapted to make or break an electrical circuit, according to its level, a displacer movable within the envelope in response to the coil for changing the mercury level, and means for effecting unequal time delays for making and breaking the electrical circuit, said means including a valve seat, a porous packing beneath the seat, and a globule of mercury resting on the seat.

8. In a mercury switch, a switch envelope, spaced electrodes in the envelope, a gas fill, a quantity of mercury in the envelope adapted to be manipulated to make or break an electrical circuit through the electrodes, a hollow body telescoped over one of the electrodes and presenting a relatively large opening to the mercury, and means associated with the body for permitting gas to pass through the upper portion of the body more rapidly in one direction than in the other whereby movement of mercury within the body to and from the said electrode is timed accordingly.

9. In a mercury switch, a switch envelope, spaced electrodes in the envelope, a gas fill, a quantity of mercury in the envelope adapted to be manipulated to make or break an electrical circuit through the electrodes, a hollow body telescoped over one of the electrodes and presenting a relatively large opening to the mercury and a relative small opening to the gas, and a check valve associated with the body to permit a free passage of gas in one direction only.

10. In a mercury switch, a switch envelope, spaced electrodes in the envelope, a gas fill, a quantity of mercury in the envelope adapted to be manipulated to make or break an electrical circuit through the electrodes, a hollow body telescoped over one of the electrodes and presenting a relatively large opening to the mercury and a relatively small opening to the gas, and a check valve associated with the body to permit a free passage of gas in one direction only, said check valve including a valve seat, a globule of mercury on the seat, and means for preventing the globule from being drawn through the seat.

11. In a relay including a coil, a switch envelope, spaced electrodes in the envelope, a gas fill, a charge of mercury adapted to make or break a circuit through the electrodes according to its level, a displacer responsive to the coil for changing the mercury level, said displacer presenting a wide opening to the mercury and a relatively small opening to the gas when the former is submerged in the mercury, and a check valve associated with the displacer for permitting free passage of gas through the displacer in one direction only, said electrodes being arranged so that the opened or closed condition of the switch is determined by the height of the mercury level within the displacer with respect to a fixed point on the envelope.

12. In a relay including a coil, a switch envelope, spaced electrodes in the envelope, a gas fill, a charge of mercury adapted to make or break a circuit through the electrodes according to its level, a displacer responsive to the coil for changing the mercury level, said displacer presenting a wide opening to the mercury and a relatively small opening to the gas when the former is submerged in the mercury, and a check valve associated with the displacer for allowing a free passage of gas from the interior to the exterior of the displacer when the displacer is lowered from its raised position, but forming a hermetical seal against ingress of gas when the movement of the displacer is reversed, said electrodes being arranged so that the opened or closed condition of the switch is determined by the height of the mercury level within the displacer with respect to a fixed point on the envelope.

13. In a relay including a coil, a switch envelope, spaced electrodes in the envelope, a gas fill, a charge of mercury adapted to make or break a circuit through the electrodes according to its level, a displacer responsive to the coil for changing the mercury level, said displacer presenting a wide opening to the mercury and a relatively small opening to the gas when the former is submerged in the mercury, and a check valve associated with the displacer for permitting free passage of gas through the displacer in one direction only, said check valve including a valve seat, a globule of mercury resting on the seat, and means for preventing the globule from being drawn through the seat.

14. In a mercury switch, a switch envelope, spaced electrodes in the envelope, a gas fill, a quantity of mercury in the envelope adapted to be manipulated to break an electrical circuit through the electrodes, a time delay element associated with one of the electrodes and including a hollow body presenting a relatively large opening to mercury and a relatively small opening to gas, and means for rendering the time delay element at times ineffectitve, the electrodes being arranged so that the opened or closed condition of the switch is determined by the height of the liquid within the displacer with respect to a fixed point on the envelope.

15. In a mercury switch, a switch envelope, spaced electrodes in the envelope, a gas fill, a quantity of mercury in the envelope for bridging the electrodes to close an electrical circuit therethrough, a time delay element telescoped over one of the electrodes and including a hollow body presenting a relatively large opening to mercury and a relatively small opening to gas, and means for rendering the time delay element at times ineffective.

16. In a mercury switch, a switch envelope, spaced electrodes in the envelope, a gas fill, a quantity of mercury in the envelope for bridging two electrodes to close an electrical circuit therethrough, a hollow body telescoped over one of the electrodes and presenting a relatively large opening to the mercury, and means associated with the body for permitting gas to enter and escape therefrom more rapidly in one direction than in the other whereby the movement of mercury within the body to and from said one electrode is timed accordingly.

17. In a mercury switch, a switch envelope, spaced electrodes in the envelope, a gas fill, a quantity of mercury in the envelope adapted to be manipulated to make or break an electrical circuit through the electrodes, a time delay element associated with one of the electrodes and adapted to retard the movement of a portion of the mercury fill in the vicinity of said one electrode, said element including a hollow body telescoped over said one electrode and presenting a relatively large opening to mercury and a relatively small opening to gas, and means for rendering the time delay element effective when the movement of mercury is in a predetermined direction, but ineffective when the movement of mercury is in the opposite direction.

CARL H. LARSON.